A. L. RUSSELL.
TRUCK FOR MILK CANS.
APPLICATION FILED MAR. 17, 1913.

1,103,689.

Patented July 14, 1914.

2 SHEETS—SHEET 1.

WITNESSES.
J. R. Keller
Robert C. Totten

INVENTOR.
Andrew Lyle Russell
By Kay & Totten
Attorneys

A. L. RUSSELL.
TRUCK FOR MILK CANS.
APPLICATION FILED MAR. 17, 1913.
1,103,689.
Patented July 14, 1914.
2 SHEETS—SHEET 2.
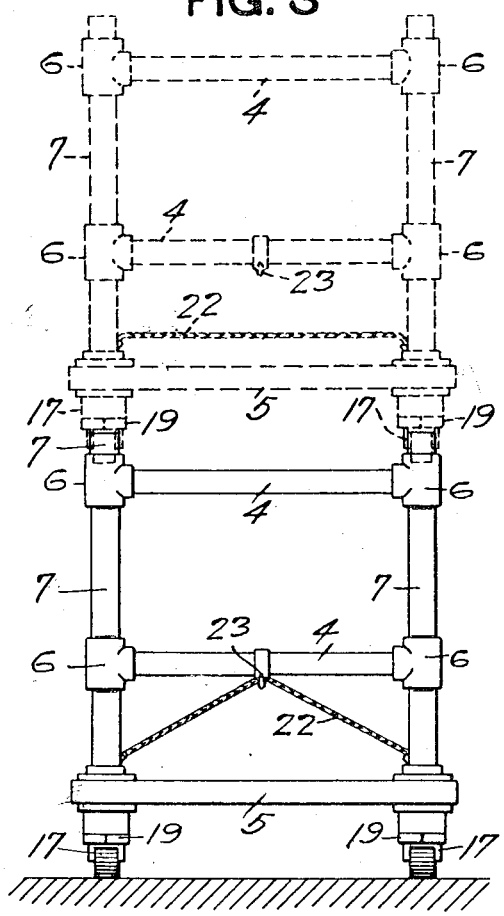
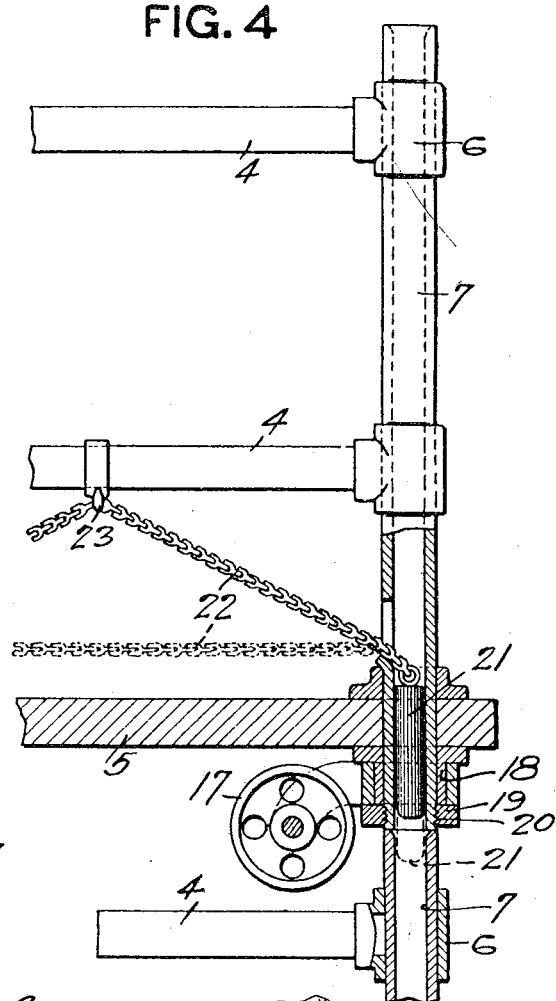
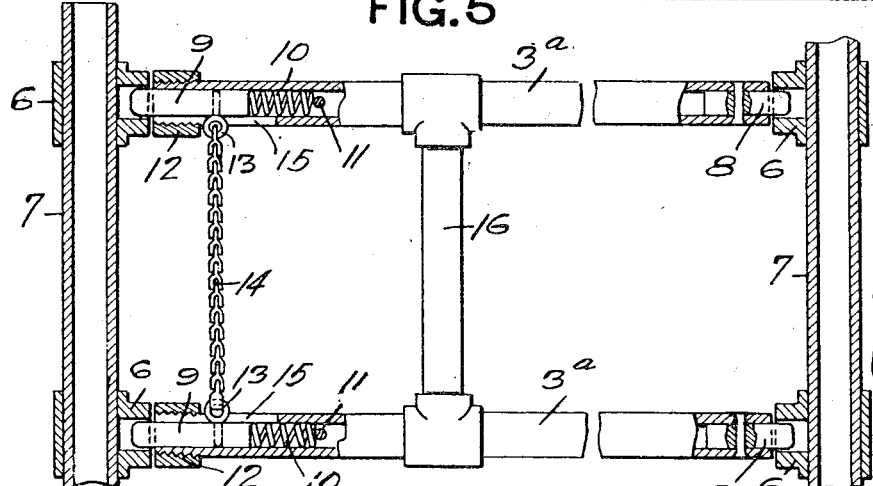
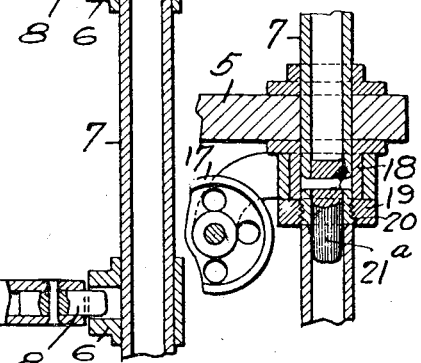
WITNESSES.
J. R. Keller
Robert C. Totten
INVENTOR.
Andrew Lyle Russell
By Kay & Totten
Attorneys

UNITED STATES PATENT OFFICE.

ANDREW LYLE RUSSELL, OF MIDWAY, PENNSYLVANIA.

TRUCK FOR MILK-CANS.

1,103,689. Specification of Letters Patent. Patented July 14, 1914.

Application filed March 17, 1913. Serial No. 754,924.

*To all whom it may concern:*

Be it known that I, ANDREW LYLE RUSSELL, a citizen of the United States, and resident of Midway, in the county of Washington and State of Pennsylvania, have invented a new and useful Improvement in Trucks for Milk-Cans; and I do hereby declare the following to be a full, clear, and exact description thereof.

My invention relates to trucks for transporting milk-cans.

The object of my invention is to provide a truck for milk-cans for use at railway stations onto which the full or empty cans are placed for shipment, and make provision for the nesting of one truck on the other so as to form a double-decker. The idea being to load the cans upon the truck at the station platform and move the trucks onto the car to be carried to the place of destination, where the trucks can be hauled from the cars and the milk-cans removed to be loaded on the wagons for distribution. In this way the time heretofore required in moving the cans one by one from the station platform to the car or from the car to the platform is done away with, and the loaded trucks are moved onto or off the car, thereby doing away with the long delays in which the trains are held up due to this loading and unloading. Furthermore, the cans are protected from the rough usage to which they are subjected in the present mode of handling and the lives of the cans are greatly prolonged.

To these ends my invention comprises the novel features hereinafter set forth and claimed.

Figure 1:
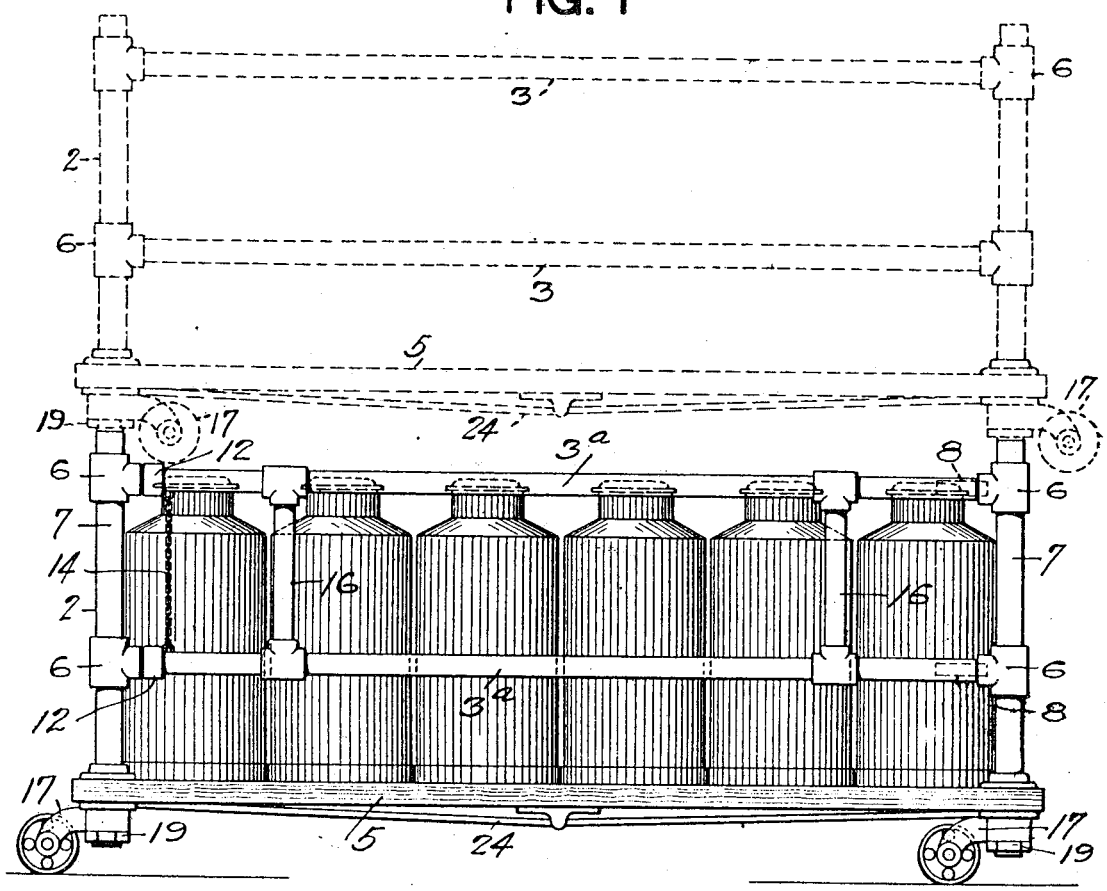
Figure 2:
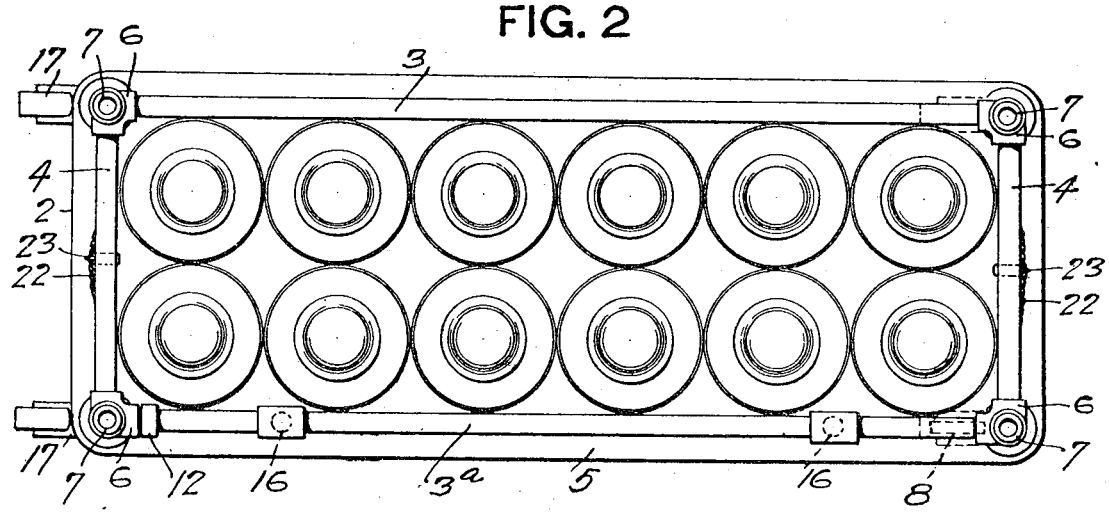

In the drawing Figure 1 is a side elevation of a truck embodying my invention; Fig. 2 is a plan view; Fig. 3 is an end view; Fig. 4 is an enlarged sectional view of a portion of two trucks showing the manner in which a double-decker is formed; Fig. 5 is a detail partly in section showing the manner in which the side bars may be removed in placing the cans on the truck or removing them therefrom; and Fig. 6 is a modified form.

In the drawings, the numeral 2 designates the truck which is preferably made up of sections of pipe 3 forming the sides and the sections 4 forming the ends. A suitable bottom 5 is provided. The sides 3 and the ends 4 fit in the elbows 6 in the uprights 7.

The side-bars 3ª at one side of the truck are made to be movable and at one of the ends of said side-bars are the plugs 8 which are adapted to enter the elbows 6 and at the other ends of the side-bars are the movable bolts 9 which fit within the side bars and are normally forced outward by the springs 10 interposed between the inner ends of said bolts and the stop 11. Collars 12 are screwed on the rods 3ª. To provide for the withdrawal of the bolts 9 simultaneously, the bolts are provided with the eye-screws 13 connected by the chain 14. The side-bars 3ª are slotted as at 15 so that when the chain is grasped and pulled to the right, as shown in Fig. 5, the bolts 9 are withdrawn and the side bars may be removed together, being connected by the cross-pieces 16.

The truck is provided with the casters 17 which are swiveled around the casting 18 as shown in Fig. 4 and are held in place by the nuts 19, which engage a threaded portion 20 at the lower ends of the corner uprights 7. A gravity operated bolt 21 is contained within the lower corner of each vertical upright, and connected to the upper end of said bolt is a chain 22, the other end of which is connected to the opposite bolt, and when said bolts are raised as indicated in Fig. 4 said chain is adapted to engage the hook 23. Tension rods 24 are provided at each side of the truck for giving strength and rigidity to the frame-work, and to prevent sagging.

When the cans are to be loaded on the truck, the side bars 3ª are removed by drawing on the chain 14, and withdrawing the bolts 9 whereupon the milk cans are lifted onto the bottom 5 and arranged as shown. When the truck has been loaded, the side bars 3ª are again put in position and if another truck is to be loaded for shipment, the empty truck is lifted up into the position shown in dotted lines Fig. 1, so as to bring the bolts 21 into register with the sockets or open upper ends of the standards 7. The chains 22 are then released from the hook 23 whereupon the bolts 21 drop down by gravity into the standards of the lower truck as indicated in dotted lines Fig. 4. In this way a double-decker is formed and milk-cans can then be loaded on the platform of the upper truck, the bolts 21 acting to hold the trucks together, and when both trucks have been loaded in this way, they may be hauled into the car to be arranged therein, so that a number of these double-deckers may be conveniently positioned within the car. By arranging one truck on another in this manner all the available space in the car is utilized and moreover, the cans are so taken care of that they are not piled one upon the other and dented, but are kept from moving about, and when they reach their destination, the trucks are rolled out of the car onto the platform and the time heretofore expended in removing each can from the car to the platform is done away with and the long stops occasioned by such delay on railroads are avoided. As the truck arrives at a station, the cans are all loaded on the trucks ready to be moved right onto the car, while empty cans are ready to be moved from the train to the platform, so that the running time of what are known as "mixed" trains is greatly reduced, as well as the expense of transportation.

Milk-cans are not of such construction as to be loaded in tiers piled one upon the other, but by my invention, where a double-decker is employed, available space in a car is practically all made use of, so that the number of cars required for shipment is greatly reduced.

In Fig. 6 the stationary pins 21ª are employed which are adapted to enter the sockets at the corners of the truck below.

What I claim is:

1. In trucks for milk-cans adapted for stacking, the combination of a frame, wheels supporting same, seats formed at the upper corners of said frame, and engaging members at the lower corners adapted to enter corresponding seats of a similar truck, whereby a plurality of trucks may be stacked one upon the other.

2. In trucks for milk-cans adapted for stacking, the combination of a frame, wheels supporting same, seats formed at the upper corners of said frame, and gravity operated bolts at the lower corners adapted to enter corresponding seats of a similar truck, whereby a plurality of trucks may be stacked one upon the other.

3. In trucks for milk-cans adapted for stacking, the combination of a frame, wheels supporting same, seats formed at the upper corners of said frame, gravity operated bolts at the lower corners of said frame adapted to enter corresponding seats of a similar truck, a chain connecting pairs of said bolts, and a support on said frame for said chain.

In testimony whereof, I the said ANDREW LYLE RUSSELL have hereunto set my hand.

ANDREW LYLE RUSSELL.

Witnesses:
ROBERT C. TOTTEN,
JOHN F. WILL.